(12) United States Patent
Kaya

(10) Patent No.: US 7,729,838 B2
(45) Date of Patent: Jun. 1, 2010

(54) VEHICLE AND CONTROL METHOD OF THE SAME

(75) Inventor: Yasuhiro Kaya, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 649 days.

(21) Appl. No.: 11/662,544

(22) PCT Filed: Oct. 12, 2005

(86) PCT No.: PCT/JP2005/019159

§ 371 (c)(1),
(2), (4) Date: Mar. 12, 2007

(87) PCT Pub. No.: WO2006/043574

PCT Pub. Date: Apr. 27, 2006

(65) Prior Publication Data

US 2008/0045377 A1 Feb. 21, 2008

(30) Foreign Application Priority Data

Oct. 19, 2004 (JP) .............................. 2004-303796

(51) Int. Cl.
*G06F 7/00* (2006.01)
(52) U.S. Cl. .............................. 701/54; 701/55; 477/43
(58) Field of Classification Search ............. 701/53–57; 73/115.01, 115.02; 477/34, 36, 43
See application file for complete search history.

(56) References Cited

U.S. PATENT DOCUMENTS

| | | | |
|---|---|---|---|
| 5,580,331 A | 12/1996 | Shiraishi et al. | |
| 5,603,673 A | 2/1997 | Minowa et al. | |
| 5,625,558 A | 4/1997 | Togai et al. | |
| 6,569,059 B1 * | 5/2003 | Ito | .............................. 477/110 |
| 7,213,665 B2 * | 5/2007 | Yamaguchi et al. | ...... 180/65.27 |
| 7,237,634 B2 * | 7/2007 | Severinsky et al. | ....... 180/65.23 |
| 7,555,373 B2 * | 6/2009 | Shimizu et al. | ............... 701/22 |
| 2004/0040375 A1 * | 3/2004 | Kadota et al. | ................. 73/116 |
| 2004/0153233 A1 | 8/2004 | Minowa et al. | |

FOREIGN PATENT DOCUMENTS

| | | |
|---|---|---|
| JP | 09-308012 | 11/1997 |
| JP | 11-093722 | 4/1999 |
| JP | 2002-285880 | 10/2002 |

\* cited by examiner

*Primary Examiner*—Yonel Beaulieu
(74) *Attorney, Agent, or Firm*—Kenyon & Kenyon LLP

(57) ABSTRACT

A vehicle having a sun gear, a carrier, and a ring gear of a planetary gear mechanism respectively connected to a first motor, an engine, and a drive shaft and second motor. When the combination of measured accelerator opening and measured vehicle speed is in an ordinary acceleration area, the vehicle sets a torque demand to decrease with an increase in measured vehicle speed at a specific reduction rate that ensures substantially constant output power to the drive shaft corresponding to the accelerator opening. When the combination of the measured accelerator opening and the measured vehicle speed is in an acceleration feel improvement area, on the other hand, the vehicle sets the torque demand to an extent of or below a maximum allowable value of the torque demand to decrease with an increase in measured vehicle speed at a lower reduction rate than the specific reduction rate.

20 Claims, 10 Drawing Sheets

(a)

(b)

VEHICLE AND CONTROL METHOD OF THE SAME

This is a 371 national phase application of PCT/JP2005/019159 filed 12 Oct. 2005, which claims priority to Japanese Patent Application No. 2004-303796 filed 19 Oct. 2004, the contents of which are incorporated herein by reference.

TECHNICAL FIELD

The present invention relates to a vehicle driven with power from a power output apparatus and a control method of such a vehicle.

BACKGROUND ART

In one proposed vehicle, a sun gear, a carrier, and a ring gear of a planetary gear mechanism are respectively connected to a first motor, to an engine, and to a second motor and a drive shaft linked with drive wheels (see, for example, Japanese Patent Laid-Open Gazette No. H09-308012). The proposed vehicle sets a torque command required to output to the drive shaft according to a torque command setting map, which decreases the torque command with an increase in rotation speed of the drive shaft (vehicle speed), in order to ensure a substantially constant power level output to the drive shaft against the driver's depression amount of an accelerator pedal. The output power of the engine goes through torque conversion by the planetary gear mechanism and the first and the second motors. Such torque conversion enables a power equivalent to the torque command to be output to the drive shaft. The engine may be driven at any drive point that ensures output of the power equivalent to the torque command to the drive shaft. Driving the engine at a possible most efficient drive point enables the enhanced energy efficiency.

DISCLOSURE OF THE INVENTION

In the prior art vehicle discussed above, the torque command setting map is designed to decrease the torque command with an increase in rotation speed of the drive shaft, in order to ensure the substantially constant power level output to the drive shaft against the driver's depression amount of the accelerator pedal. Namely the acceleration of the vehicle decreases with an increase in vehicle speed under the condition of a fixed depression amount of the accelerator pedal to accelerate the vehicle. When the variation in torque command against the rotation speed of the drive shaft is determined to ensure output of the substantially constant power against the fixed depression amount of the accelerator pedal, the engine is generally driven at the drive point of the highest efficiency to ensure the required output power. The vehicle is accordingly accelerated at the substantially constant engine drive point (substantially uniform engine sound) under the condition of the fixed depression amount of the accelerator pedal. This state may lead to the poor acceleration feel. One possible measure to improve the driver's acceleration feel uses a high-performance engine and high-performance motors. The use of the power source having excess performances, however, undesirably expands the overall size of the vehicle and raises the total manufacturing cost.

The vehicle and the vehicle control method of the invention aim to improve the driver's acceleration feel. The vehicle and the vehicle control method of the invention especially aim to improve the driver's acceleration feel without a power source of excess performances.

In order to attain at least part of the above and the other related objects, the vehicle and the vehicle control method of the invention have the configurations and the arrangements discussed below.

The present invention is directed to a vehicle driven with output power of a power output apparatus and including: an accelerator depression amount measurement unit that measures a driver's depression amount of an accelerator pedal or an accelerator depression amount; a vehicle speed measurement unit that measures a speed of said vehicle or a vehicle speed; a first driving power demand setting module that sets a driving power demand required for said vehicle to decrease at a first reduction rate with an increase in measured vehicle speed against the measured accelerator depression amount; a second driving power demand setting module that is activated, instead of said first driving power demand setting module, at least when the measured accelerator depression amount is in a preset accelerator depression range of less than a maximum accelerator depression amount, said second driving power demand setting module setting the driving power demand to decrease at a second reduction rate, which is at least lower than the first reduction rate, with an increase in measured vehicle speed to an extent of or below a maximum allowable driving power output from said power output apparatus; and a drive control module that drives and controls said power output apparatus to drive said vehicle with a driving power equivalent to the set driving power demand.

The vehicle of the invention sets the driving power demand required for the vehicle to decrease at the first reduction rate with an increase in measured vehicle speed against the driver's depression amount of the accelerator pedal or the accelerator depression amount. At least when the accelerator depression amount is in the preset accelerator depression range of less than the maximum accelerator depression amount, the vehicle sets the driving power demand to decrease at the second reduction rate, which is at least lower than the first reduction rate, with an increase in measured vehicle speed to the extent of or below the maximum allowable driving power output from the power output apparatus. The power output apparatus is driven and controlled to drive the vehicle with a driving power equivalent to the set driving power demand. This arrangement effectively ensures the driver's acceleration feel in the preset accelerator depression range. The driving power demand is set to the extent of or below the maximum allowable driving power output from the power output apparatus to decrease with an increase in vehicle speed at the second reduction rate that is at least lower than the first reduction rate, when the accelerator depression amount is in the preset accelerator depression range of less than the maximum accelerator depression amount. The vehicle is thus not required to have a power source of excess performances. Here the terminology 'the second reduction rate that is at least lower than the first reduction rate' is not restricted to a decrease in driving power demand with an increase in vehicle speed but includes an increase in driving power demand with an increase in vehicle speed.

In the vehicle of the invention, said second driving power demand setting module may set the driving power demand to ensure a greater output power of said power output apparatus with an increase in measured vehicle speed against the measured accelerator depression amount, compared with said first driving power setting module.

In the vehicle of the invention, said second driving power demand setting module may set the lower driving power demand at the second reduction rate, which decreases against the measured accelerator depression amount closer to a specific depression level in the preset accelerator depression range.

In the vehicle of the invention, the second driving power demand setting module may set the driving power demand to increase with an increase in measured vehicle speed, at least when the measured accelerator depression amount is substantially equal to a specific depression level in the preset accelerator depression range. This arrangement ensures the driver's better acceleration feel, at least when the accelerator depression amount is practically equal to the specific depression level.

In the vehicle of the invention, the second driving power demand setting module may set the driving power demand to accelerate the vehicle at a substantially constant acceleration against the measured accelerator depression amount regardless of the measured vehicle speed in a preset vehicle speed range, at least when the measured accelerator depression amount is substantially equal to a specific depression level in the preset accelerator depression range. This arrangement enables the vehicle to be accelerated at the substantially constant acceleration, at least when the accelerator depression amount is practically equal to the specific depression level.

In one preferable embodiment of the vehicle of the invention, the second driving power demand setting module corrects the driving power demand set by the first driving power demand setting module to an increased value and sets the increased value to the driving power demand. In the vehicle of this embodiment, it is preferable that the second driving power demand setting module corrects the driving power demand set by the first driving power demand setting module to the increased value, based on a reduction of the driving power demand set by the first driving power demand setting module under acceleration of the vehicle for a time period between a start of acceleration and a present moment. This arrangement effectively prevents a fall of the driving power to accelerate the vehicle in the preset accelerator depression range. The second driving power demand setting module may correct the driving power demand set by the first driving power demand setting module to the increased value, which becomes greater with an increase in reduction of the driving power demand set by the first driving power demand setting module. In one preferable structure, the vehicle of this embodiment further includes a driving resistance measurement unit that measures a driving resistance. The second driving power demand setting module corrects the driving power demand set by the first driving power demand setting module to the increased value, based on the measured driving resistance. This arrangement ensures the driver's better acceleration feel, regardless of the driving resistance. The second driving power demand setting module may correct the driving power demand set by said first driving power demand setting module to the increased value, which becomes greater with an increase in measured driving resistance. In another preferable embodiment of the vehicle of the invention, the second driving power demand setting module corrects the driving power demand set by said first driving power demand setting module to the increased value, based on the measured accelerator depression amount. In the vehicle of this embodiment, it is preferable that the second driving power demand setting module corrects the driving power demand set by said first driving power demand setting module to the increased value, which becomes greater against the measured accelerator depression amount closer to a specific depression level in the preset accelerator depression range.

In the vehicle of the invention, said power output apparatus may include: an internal combustion engine; and a continuously variable transmission mechanism that converts power of the internal combustion engine by continuously variable torque conversion and outputs the converted power.

In another preferable embodiment of the vehicle of the invention, said power output apparatus includes: an internal combustion engine; an electric power-mechanical power input output mechanism that is connected to an output shaft of the internal combustion engine and to a drive shaft linked with drive wheels of said vehicle and outputs at least part of output power of the internal combustion engine to the drive shaft; and a motor that is capable of inputting and outputting power from and to the drive shaft. In this embodiment, it is preferable that the electric power-mechanical power input output mechanism include: a three shaft-type power input output module that is linked to three shafts, that is, the output shaft of the internal combustion engine, the drive shaft, and a third rotating shaft, and automatically determines power input from and output to a residual one shaft based on powers input from and output to any two shafts among the three shafts; and a generator that is capable of inputting and outputting power from and to the third rotating shaft. It is also preferable that the electric power-mechanical power input output mechanism includes a pair-rotor motor that has a first rotor connected to the output shaft of the internal combustion engine and a second rotor connected to the drive shaft, and outputs at least part of the output power of the internal combustion engine to the drive shaft with input and output of electric power and mechanical power by electromagnetic function of the first rotor relative to the second rotor.

The present invention is directed to a control method of a vehicle that is driven with output power of a power output apparatus and including the steps of: (a) setting a driving power demand required for said vehicle to decrease at a first reduction rate with an increase in measured vehicle speed against a driver's depression amount of an accelerator pedal or accelerator depression amount; (b) at least when the accelerator depression amount is in a preset accelerator depression range of less than a maximum accelerator depression amount, instead of said step (a), setting the driving power demand to decrease at a second reduction rate, which is at least lower than the first reduction rate, with an increase in measured vehicle speed to an extent of or below a maximum allowable driving power output from said power output apparatus; and (c) driving and controlling said power output apparatus to drive said vehicle with a driving power equivalent to the set driving power demand.

The control method of the vehicle of the invention sets the driving power demand required for the vehicle to decrease at the first reduction rate with an increase in measured vehicle speed against the driver's depression amount of the accelerator pedal or the accelerator depression amount. At least when the accelerator depression amount is in the preset accelerator depression range of less than the maximum accelerator depression amount, the control method of the vehicle of the invention sets the driving power demand to decrease at the second reduction rate, which is at least lower than the first reduction rate, with an increase in measured vehicle speed to the extent of or below the maximum allowable driving power output from the power output apparatus. The power output apparatus is driven and controlled to drive the vehicle with a driving power equivalent to the set driving power demand. This arrangement effectively ensures the driver's acceleration feel in the preset accelerator depression range. The driving power demand is set to the extent of or below the maximum allowable driving power output from the power output apparatus to decrease with an increase in vehicle speed at the second reduction rate that is at least lower than the first reduction rate, when the accelerator depression amount is in the preset accelerator depression range of less than the maximum accelerator depression amount. The vehicle is thus not required to have a power source of excess performances. Here the terminology 'the second reduction rate that is at least lower than the first reduction rate' is not restricted to a decrease in driving power demand with an increase in vehicle speed but includes an increase in driving power demand with an increase in vehicle speed.

BEST MODES OF CARRYING OUT THE INVENTION

Some modes of carrying out the invention are described below as preferred embodiments.

First Embodiment

Figure 1:
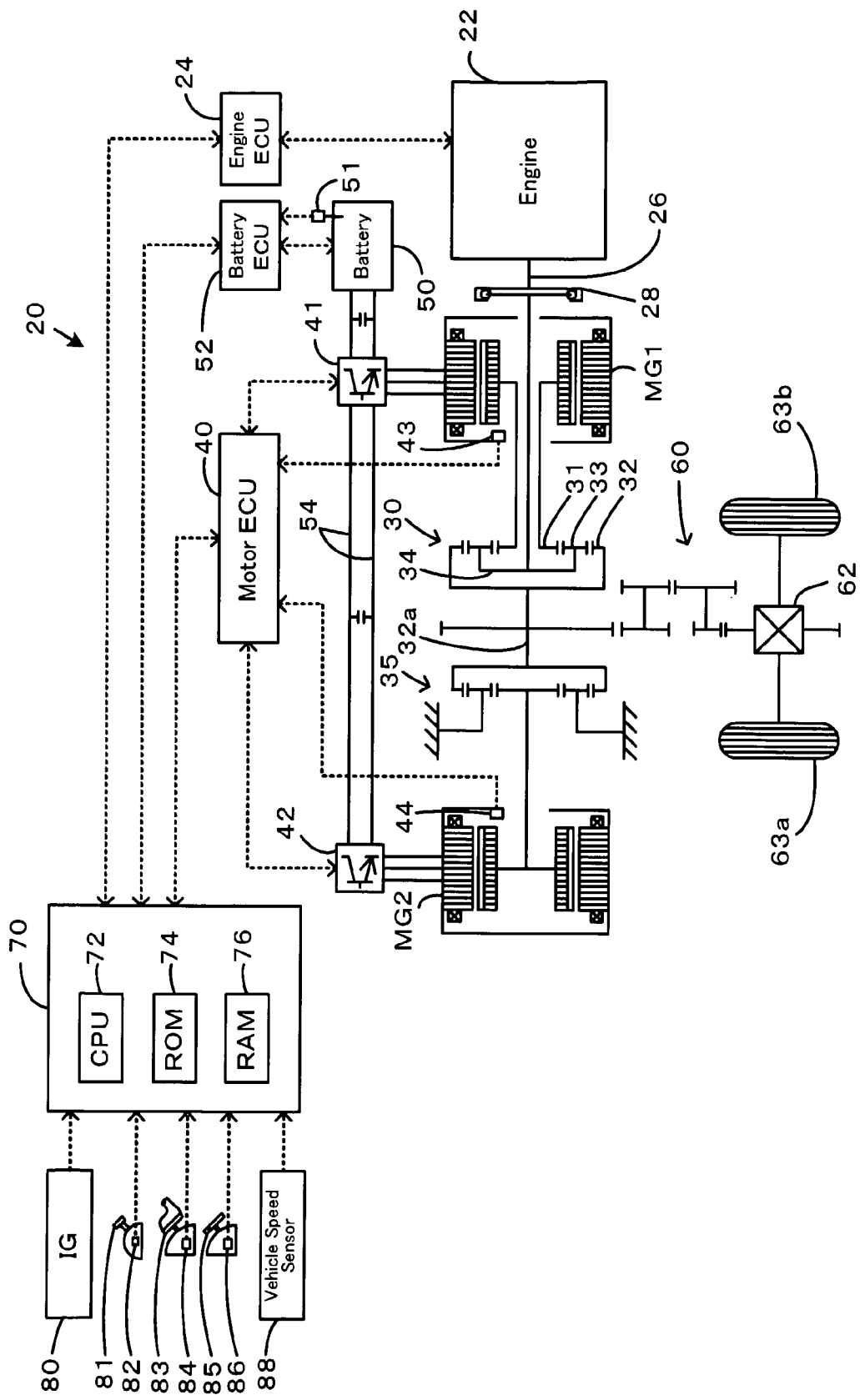
FIG. 1 schematically illustrates the configuration of a hybrid vehicle equipped with a power output apparatus in a first embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the first embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. said motor.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
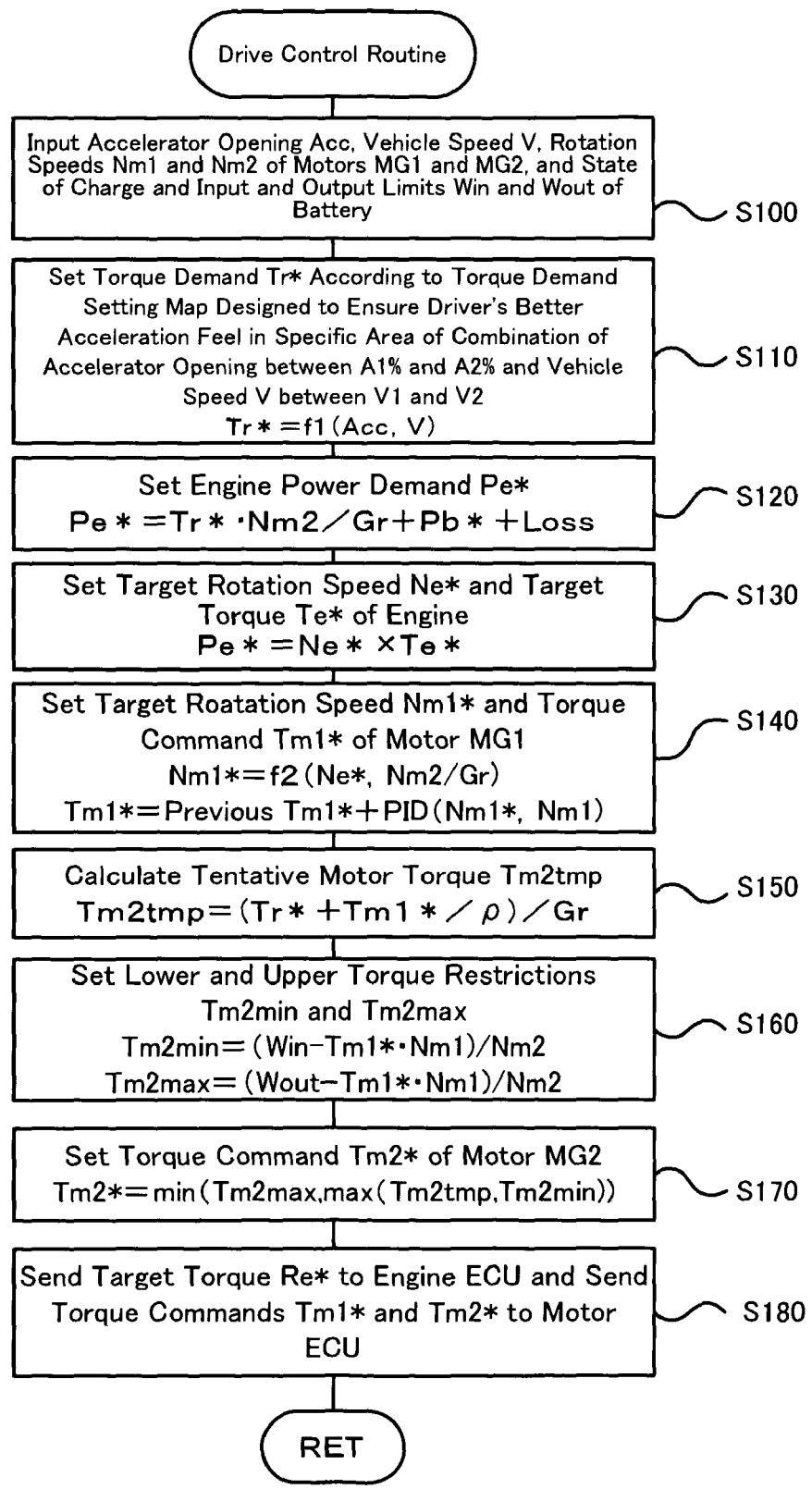
FIG. 2 is a flowchart showing a drive control routine executed by a hybrid electronic control unit in the hybrid vehicle of the first embodiment.

The description now regards the operations of the hybrid vehicle 20 of the first embodiment having the configuration discussed above. FIG. 2 is a flowchart showing a drive control routine executed by the hybrid electronic control unit 70 in the hybrid vehicle 20 of the first embodiment. This drive control routine is carried out repeatedly at preset time intervals (for example, at every 8 msec).

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, the state of charge (SOC) of the battery 50, and an input limit Win and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the measured temperature Tb of the battery 50 and the observed current state of charge (SOC) of the battery 50 according to an input-output limit setting routine (not shown) and are received from the battery ECU 52 by communication.

Figure 3:
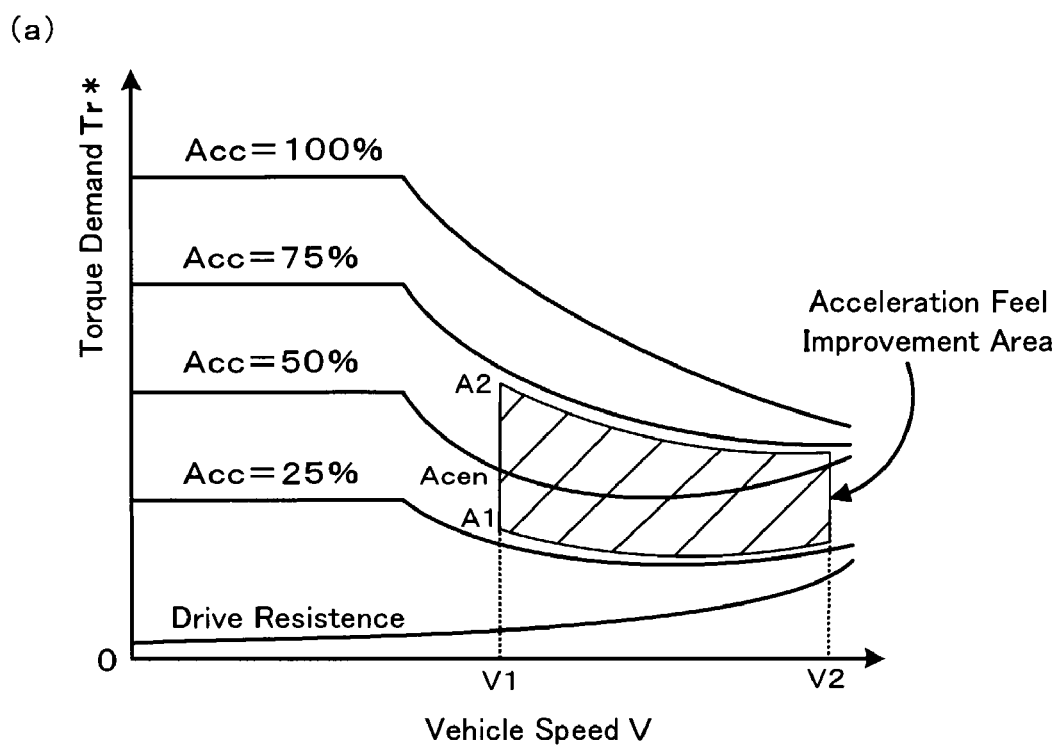
FIG. 3 shows one example of a torque demand setting map.
Figure 3:
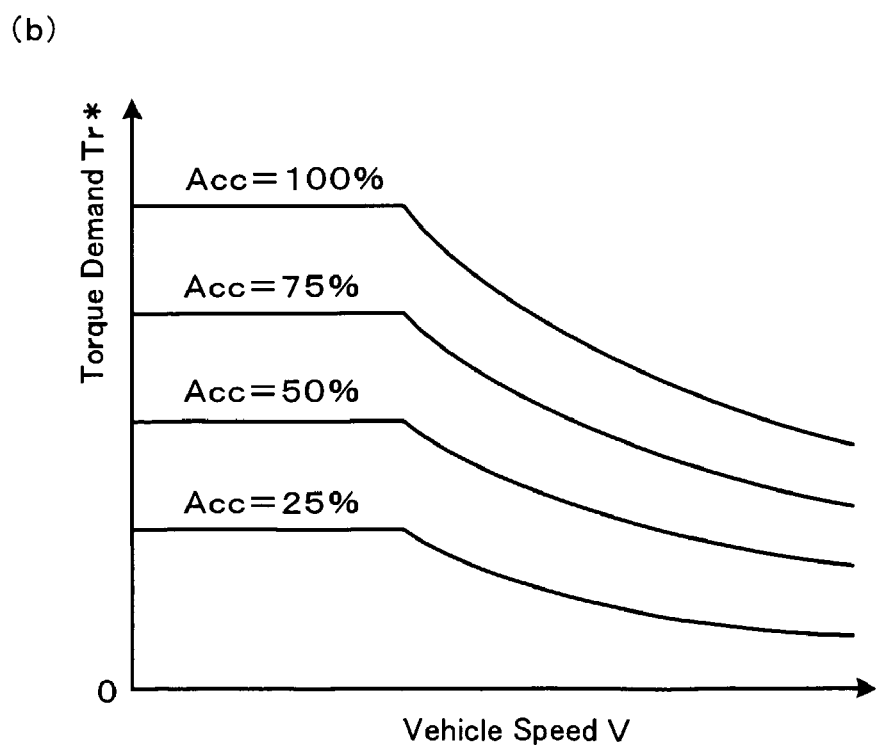

After the data input, the CPU 72 sets a torque demand Tr* to be output to the ring gear shaft 32a or the drive shaft with the driver's better acceleration feel in an acceleration feel improvement area, based on the input accelerator opening Acc and the input vehicle speed V (step S110). The concrete procedure of setting the torque demand Tr* in the first embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from the torque demand setting map. In the torque demand setting map, the torque demand Tr* is set to decrease with an increase in vehicle speed V at a specific reduction rate that ensures the substantially constant output power to the ring gear shaft 32a corresponding to the accelerator opening Acc, when the combination of the accelerator opening Acc and the vehicle speed V is in an ordinary acceleration area. In the torque demand setting map, the torque demand Tr* is set to an extent of or below a maximum allowable value of the torque demand Tr* (the torque demand Tr* at the accelerator opening Acc of 100%) to decrease with an increase in vehicle speed V at a lower reduction rate than the specific reduction rate, when the combination of the accelerator opening Acc and the vehicle speed V is in an acceleration feel improvement area. The lower reduction rate decreases against the accelerator opening Acc closer to a center opening Acen, for example, 50%. In the torque demand setting map, the torque demand Tr* in the acceleration feel improvement area is also set to increase with an increase in vehicle speed V with regard to the accelerator opening Acc practically equal to the center opening Acen. The acceleration feel improvement area is defined by the combination of the accelerator opening Acc between a preset first opening A1, for example, 30%, and a preset second opening A2, for example, 70% and the vehicle speed V between a preset first speed V1, for example, 60 km/h, and a preset second speed V2, for example, 120 km/h. One example of the torque demand setting map adopted in this embodiment is shown in FIG. 3(a). For the purpose of comparison, FIG. 3(b) shows variations in torque demand Tr* against the accelerator opening Acc and the vehicle speed V as a conventional torque demand setting map. The conventional torque demand setting map is designed to decrease the torque demand Tr* with an increase in vehicle speed V at the specific reduction rate that ensures the substantially constant output power to the ring gear shaft 32a corresponding to the accelerator opening Acc, over the whole acceleration area with any combination of the accelerator opening Acc and the vehicle speed V. The torque demand setting map adopted in this embodiment gives the larger torque demand Tr* against the higher vehicle speed V to attain the substantially constant acceleration of the hybrid vehicle 20 in the range of the vehicle speed V between the preset first level V1 and the preset second level V2 under the condition of the accelerator opening Acc practically equal to the center opening Acen. The variations in torque demand Tr* against the accelerator opening Acc and the vehicle speed V are set to have at least the lower reduction rate in the acceleration feel improvement area than the specific reduction rate that ensures output of the substantially constant power to the ring gear shaft 32a corresponding to the accelerator opening Acc. Namely the output power to the ring gear shaft 32a increases with an increase in vehicle speed V against the accelerator opening Acc.

After setting the torque demand Tr*, the CPU 72 calculates an engine power demand Pe* to be output from the engine 22 as the sum of the product of the torque demand Tr* and the rotation speed Nr of the ring gear shaft 32a, a charge-discharge power demand Pb* of the battery 50, and a potential loss (step S120). The charge-discharge power demand Pb* of the battery 50 is set based on the current state of charge (SOC) of the battery 50 and the accelerator opening Acc. The rotation speed Nr of the ring gear shaft 32a is obtained by multiplying the vehicle speed V by a predetermined conversion coefficient or by dividing the rotation speed Nm2 of the motor MG2 by a gear ratio Gr of the reduction gear 35.

Figure 4:
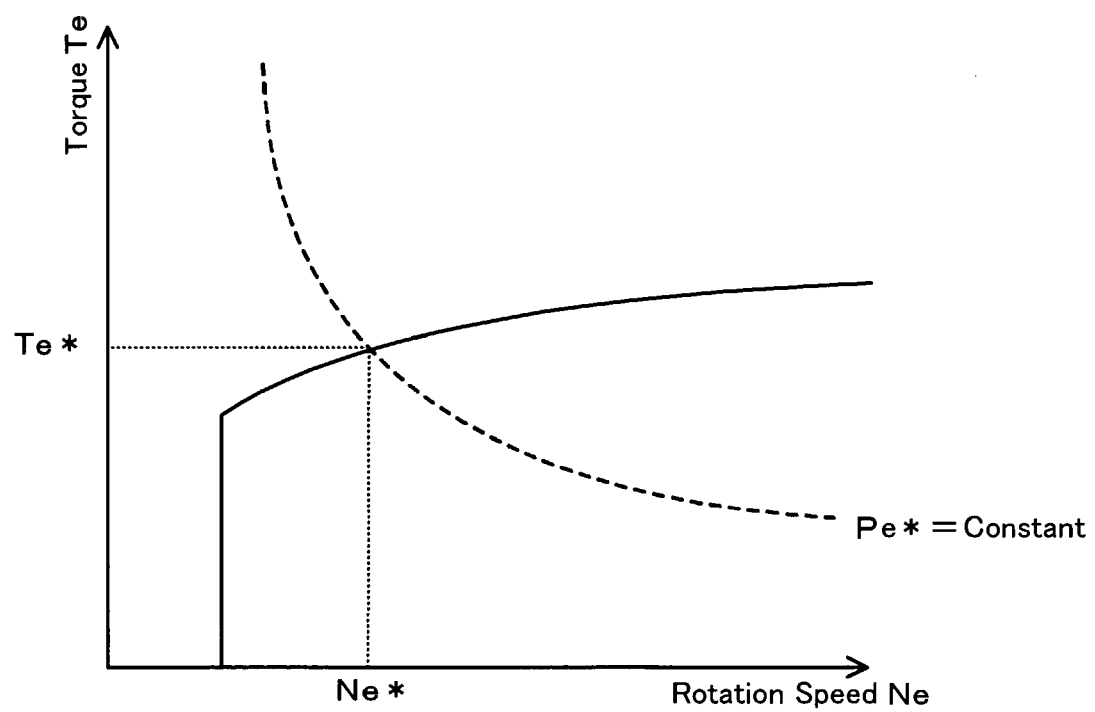
FIG. 4 shows an efficient operation line of an engine to set a target rotation speed Ne* and a target torque Te*.

The CPU 72 sets a target rotation speed Ne* and a target torque Te* of the engine 22, based on the engine power demand Pe* (step S130). The target rotation speed Ne* and the target torque Te* of the engine 22 are determined according to an efficient operation line of ensuring efficient operations of the engine 22 and the power demand P*. FIG. 4 shows an efficient operation line of the engine 22 to set the target rotation speed Ne* and the target torque Te*. The target rotation speed Ne* and the target torque Te* are given at an intersection of the efficient operation line and a line of constant power demand Pe* (=Ne*×Te*). In one example, it is assumed that the driver depresses the accelerator pedal 83 to accelerate the hybrid vehicle 20 under the condition of the accelerator opening Acc in the acceleration feel improvement area. In the acceleration feel improvement area, the torque demand Tr* is set to increase the output power to the ring gear shaft 32a with an increase in vehicle speed V, as described above. The greater value is thus basically set to the target rotation speed Ne* of the engine 22 with an increase in vehicle speed V. During acceleration of the hybrid vehicle 20 in the acceleration feel improvement area, the engine 22 is driven at the driver's expected rotation speed (engine sound) corresponding to the vehicle speed V. This arrangement ensures the driver's better acceleration feel.

The CPU 72 subsequently calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S140):

$$Nm1^* = (Ne^* \cdot (1+\rho) - Nm2/(Gr))/\rho \quad (1)$$

$$Tm1^* = \text{Previous } Tm1^* + KP(Nm1^* - Nm1) + KI\!\int(Nm1^* - Nm1)dt \quad (2)$$

Figure 5:
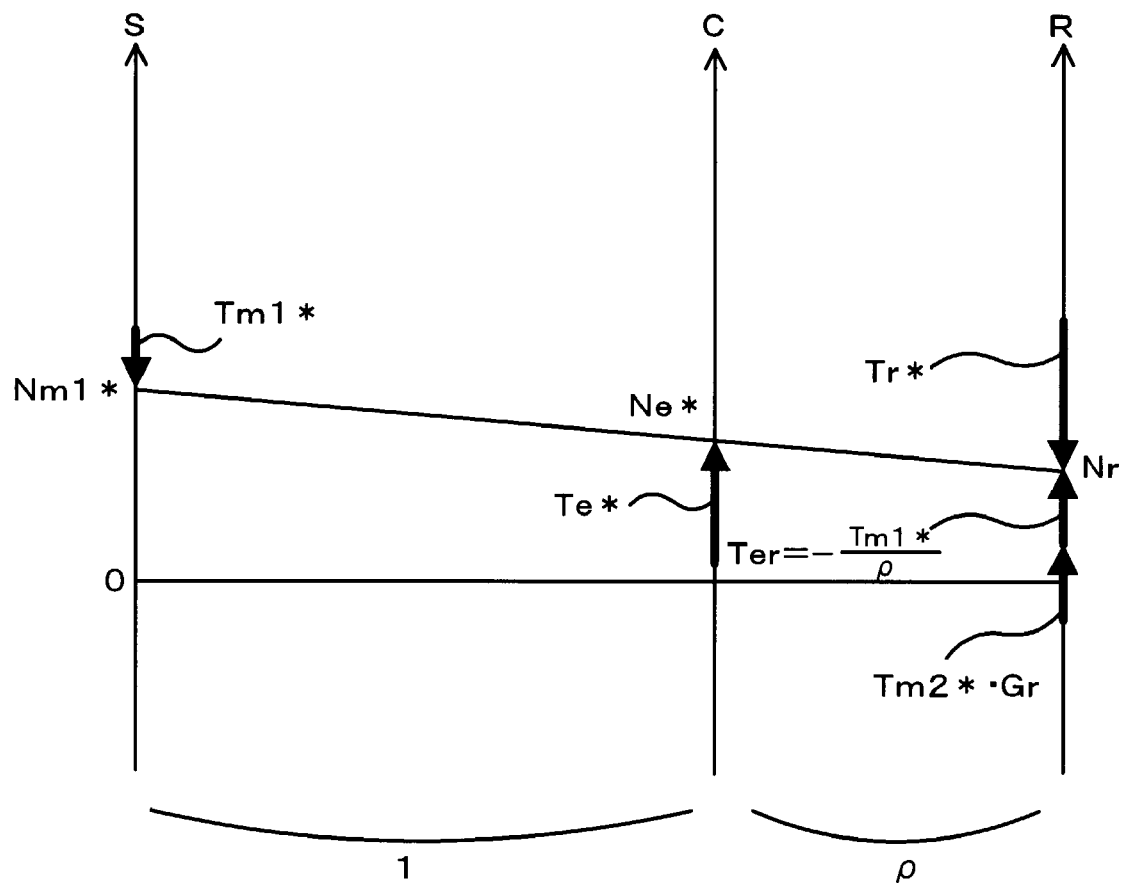
FIG. 5 is an alignment chart showing torque-rotation speed dynamics of respective rotational elements of a power distribution integration mechanism included in the hybrid vehicle of FIG. 1.

FIG. 5 is an alignment chart showing torque-rotation speed dynamics of the respective rotation elements included in the power distribution integration mechanism 30. The left axis "S" represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (the ring gear shaft 32a). The target rotation speed Nm1* of the motor MG1 is accordingly calculated from the rotation speed Nr of the ring gear shaft 32a, the target rotation speed Ne* of the engine 22, and the gear ratio ρ of the power distribution integration mechanism 30 according to Equation (1) given above. The torque command Tm1* of the motor MG1 is set to ensure rotation of the motor MG1 at the target rotation speed Nm1*. Such drive control of the motor MG1 enables the engine 22 to be rotated at the target rotation speed Ne*. Equation (2) is a relational expression of feedback control to drive and rotate the motor MG1 at the target rotation speed Nm1*. In Equation (2) given above, 'KP' in the second term and 'KI' in the third term on the right side respectively denote a gain of the proportional and a gain of the integral term. Two thick arrows on the axis 'R' in the alignment chart of FIG. 5 respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2.

After calculation of the target rotation speed Nm1* and the torque command Tm1* of the motor MG1, the CPU 72 calculates a tentative motor torque Tm2tmp to be output from the motor MG2 for application of the torque demand Tr* to the ring gear shaft 32a (step S150). The tentative motor torque Tm2tmp is calculated from the torque demand Tr*, the torque command Tm1* of the motor MG1, the gear ratio ρ of the power distribution integration mechanism 30, and the gear ratio Gr of the reduction gear 35 according to Equation (3) given below:

$$Tm2tmp = (Tr^* + Tm1^*/\rho)/Gr \quad (3)$$

Equation (3) depends upon the torque balance in the alignment chart of FIG. 5. The CPU 72 calculates a lower torque restriction Tm2min and an upper torque restriction Tm2max as minimum and maximum torques output from the motor MG2 from the input limit Win and the output limit Wout of the battery 50, the torque command Tm1* of the motor MG1, the current rotation speed Nm1 of the motor MG1, and the rotation speed Nm2 of the motor MG2 according to Equations (4) and (5) given below (step S160):

$$Tm2min = (Win - Tm1^* \cdot Nm1)/Nm2 \quad (4)$$

$$Tm2max = (Wout - Tm1^* \cdot Nm1)/Nm2 \quad (5)$$

The upper torque restriction Tm2max is compared with the greater between the calculated tentative motor torque Tm2tmp and the calculated lower torque restriction Tm2min. The smaller torque as a result of the comparison is set to the torque command Tm2* of the motor MG2 (step S170). The torque command Tm2* of the motor MG2 is accordingly set as a limited torque in the range of the input limit Win and the output limit Wout of the battery 50.

The CPU 72 sends the target rotation speed Ne* and the target torque Te* of the engine 22 to the engine ECU 24, while sending the torque commands Tm1* and Tm2* of the motors MG1 and MG2 to the motor ECU 40 (step S180), before exiting from the drive control routine. The engine ECU 24 receives the target rotation speed Ne* and the target torque Te* and executes fuel injection control and ignition control of the engine 22 to drive the engine 22 at the specified drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

Figure 6:
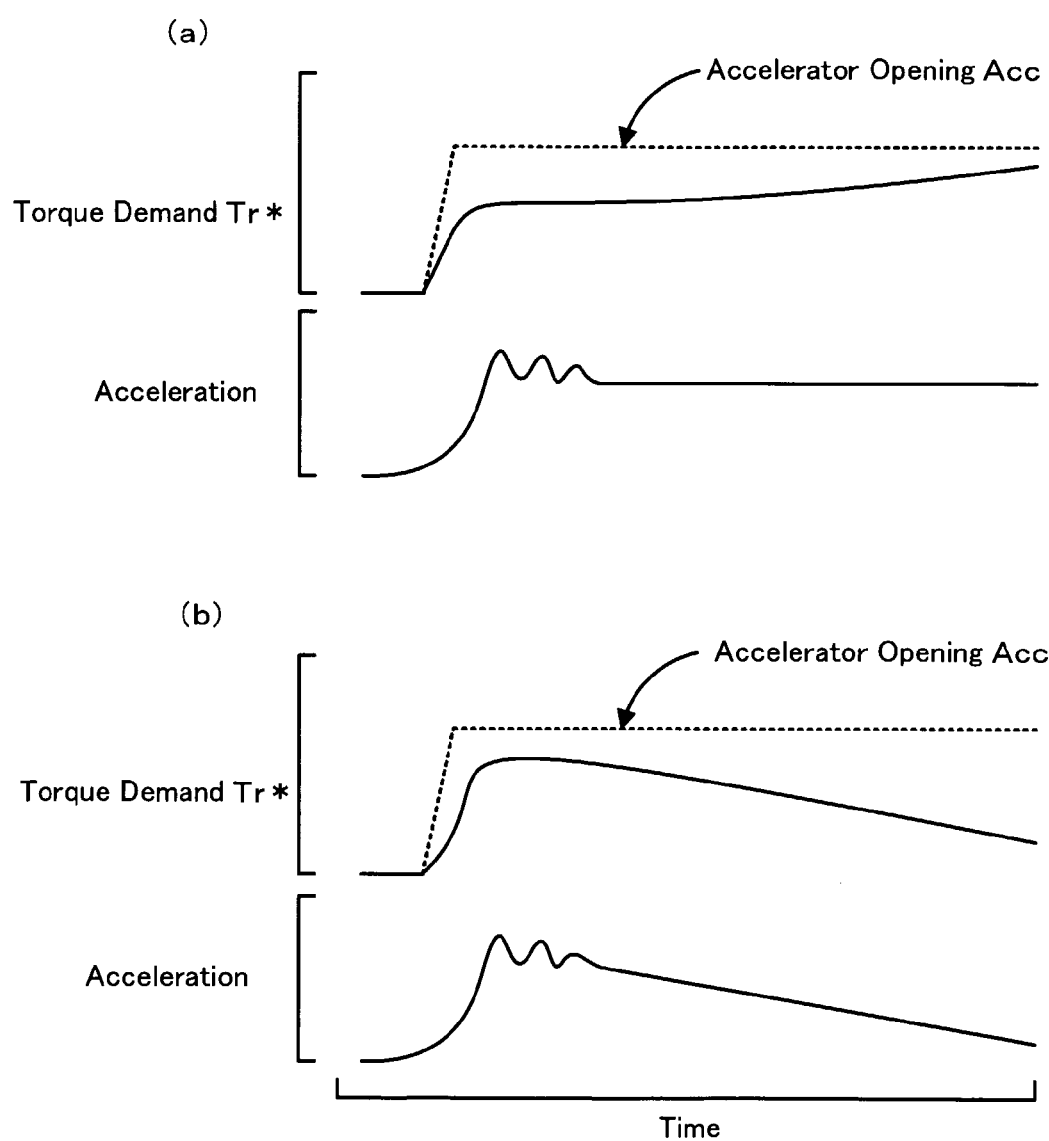
FIG. 6 shows time variations in torque demand Tr* and acceleration α of the hybrid vehicle in response to the driver's depression of an accelerator pedal under the condition of an accelerator opening Acc of 50%.

FIG. 6 shows time variations in torque demand Tr* and acceleration α of the hybrid vehicle 20 in response to the driver's depression of the accelerator pedal 83 under the condition of the accelerator opening Acc equal to the center opening Acen. FIG. 6(a) shows the time variations in the application of the torque demand setting map of FIG. 3(a) to set the torque demand Tr*. FIG. 6(b) shows the time variations in the application of the torque demand setting map of FIG. 3(b) to set the torque demand Tr*. As clearly shown by the comparison between FIG. 6(a) and FIG. 6(b), the reduction rate of the acceleration of the hybrid vehicle 20 in the application of the torque demand setting map of FIG. 3(a) to set the torque demand Tr* is controlled to be lower than that in the application of the conventional torque demand setting map of FIG. 3(b).

The hybrid vehicle 20 of the first embodiment described above prepares and stores in advance the torque demand setting map. In the torque demand setting map, when the combination of the accelerator opening Acc and the vehicle speed V is in the acceleration feel improvement area, the torque demand Tr* is set to decrease with an increase in vehicle speed V at the lower reduction rate than the specific reduction rate that ensures the substantially constant output power to the ring gear shaft 32a or the drive shaft corresponding to the accelerator opening Acc. The hybrid vehicle 20 reads the torque demand Tr* corresponding to the given accelerator opening Acc and the given vehicle speed V from the torque demand setting map and controls the engine 22 and the motors MG1 and MG2 to output a torque equivalent to the torque demand Tr* to the ring gear shaft 32a or the drive shaft. This arrangement effectively ensures the driver's better acceleration feel in the acceleration feel improvement area. The torque demand Tr* is set to the extent of or below the maximum allowable value of the torque demand Tr*. The hybrid vehicle 20 is thus not required to have a power source of excess performances. The torque demand Tr* in the acceleration feel improvement area is also set to increase the output power to the ring gear shaft 32a with an increase in vehicle speed V with regard to the accelerator opening Acc practically equal to the center opening Acen. This arrangement enables the engine 22 to be driven at the driver's expected rotation speed (engine sound) corresponding to the vehicle speed V, thus ensuring the driver's better acceleration feel.

Second Embodiment

Figure 7:
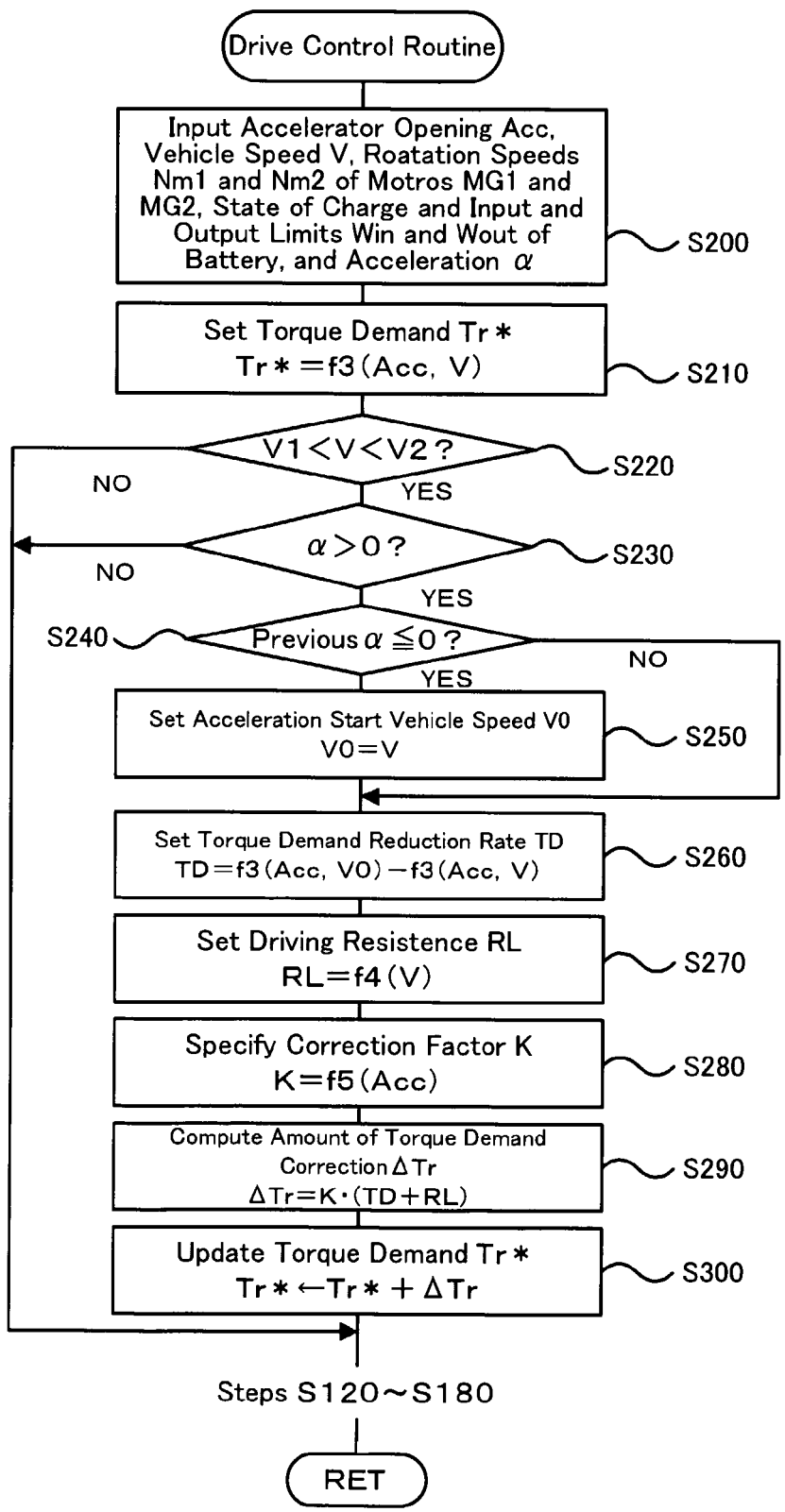
FIG. 7 is a flowchart showing a drive control routine executed by a hybrid electronic control unit in a hybrid vehicle of a second embodiment.

A hybrid vehicle 20B is described below as a second embodiment of the invention. The hybrid vehicle 20B of the second embodiment has the identical hardware configuration with that of the hybrid vehicle 20 of the first embodiment. The constituents and elements of the hybrid vehicle 20B of the second embodiment identical with those of the hybrid vehicle 20 of the first embodiment are thus expressed by the like numerals and symbols and are not specifically described here. FIG. 7 is a flowchart showing a drive control routine executed by the hybrid electronic control unit 70 included in the hybrid vehicle 20B of the second embodiment. This drive control routine is carried out repeatedly at preset time intervals (for example, at every 8 msec).

In the drive control routine, the CPU 72 of the hybrid electronic control unit 70 first inputs various data required for control, that is, the accelerator opening Acc, the vehicle speed V, the rotation speeds Nm1 and Nm2 of the motors MG1 and MG2, the state of charge (SOC) of the battery 50, the input limit Win and the output limit Wout of the battery 50, and an acceleration α of the hybrid vehicle 20B measured by an acceleration sensor (not shown) (step S200). The CPU 72 sets the torque demand Tr*, based on the input accelerator opening Acc and the input vehicle speed V (step S210). The concrete procedure of setting the torque demand Tr* in the second embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from the torque demand setting map. The torque demand setting map used in the second embodiment is designed to decrease the torque demand Tr* with an increase in vehicle speed V at the specific reduction rate that ensures the substantially constant output power to the ring gear shaft 32a corresponding to the accelerator opening Acc, as shown in FIG. 3(b).

The CPU 72 sequentially determines whether the input vehicle speed V is in a range between a preset first speed V1 and a preset second speed V2 (step S220) and whether the input acceleration α is higher than 0, that is, whether the hybrid vehicle 20B is driven at an accelerating speed (step S230). When the input vehicle speed V is out of the range between the preset speeds V1 and V2 at step S220 or when the acceleration α is not higher than 0 at step S230, that is, when the hybrid vehicle 20B is driven at a cruising speed or a reducing speed, the processing of steps S120 to S180 in the drive control routine of FIG. 2 is executed to output a torque equivalent to the torque demand Tr* set at step S210 to the ring gear shaft 32a or the drive shaft. The drive control routine of FIG. 7 is then terminated.

When it is determined at step S220 and S230 that the input vehicle speed V is in the range between the preset speeds V1 and V2 and that the acceleration α is higher than 0, the CPU 72 determines whether the previous acceleration (previous α) input at step S200 in a previous cycle of this routine is not higher than 0 (step S240). When the previous α is not higher than 0, it is determined that the current state of the vehicle is immediately after a start of acceleration. The CPU 72 accordingly sets the input vehicle speed V to an acceleration start vehicle V0 (step S250). When the previous α is higher than 0, the drive control routine skips the processing of step S250 and goes to step S260. This series of processing sets the current vehicle speed V to the acceleration start vehicle speed V0 at a start of acceleration and keeps the value of the acceleration start vehicle speed V0 until the hybrid vehicle 20B starts acceleration after being driven at a cruising speed or at a reducing speed.

Figure 8:
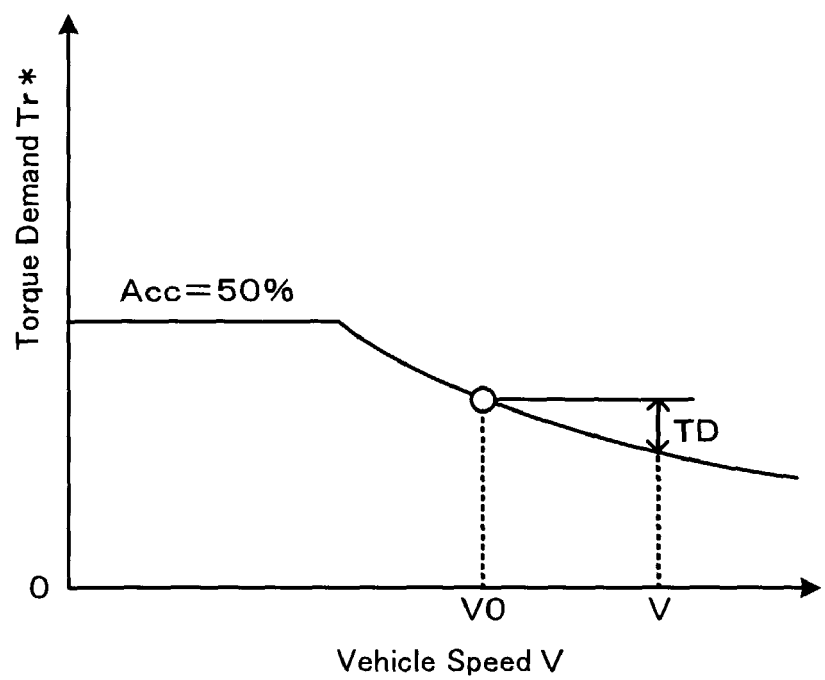
FIG. 8 shows a process of setting a torque demand reduction rate TD.

The CPU 72 refers to the torque demand setting map of FIG. 3(b) to read the torque demand Tr* corresponding to the input accelerator opening Acc and the set acceleration start vehicle speed V0 and to read the torque demand Tr* corresponding to the input accelerator opening Acc and the input vehicle speed V, and sets the difference between the torque demands Tr* to a torque demand reduction rate TD as a reduction rate of the torque demand Tr* for a time period between a start of acceleration of the vehicle and the present moment (step S260). The process of setting the torque demand reduction rate TD is shown in FIG. 8.

Figure 9:
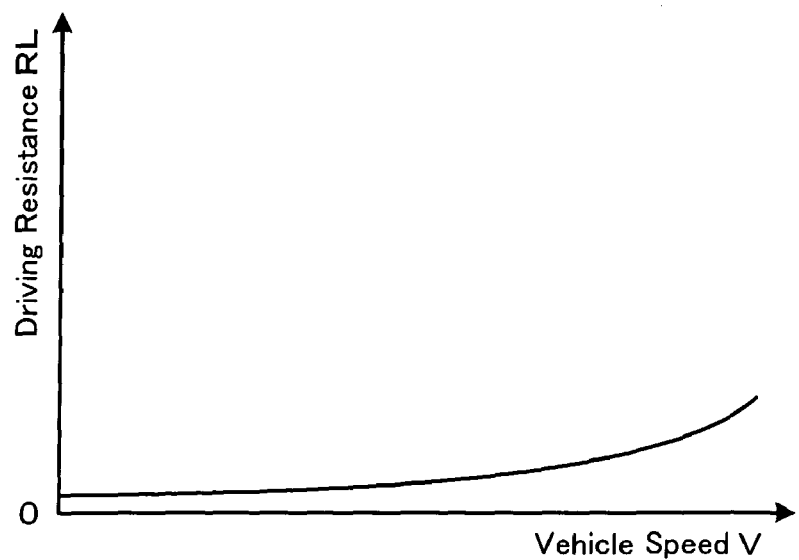
FIG. 9 shows one example of a drive resistance setting map.

The CPU 72 subsequently sets a driving resistance RL corresponding to the vehicle speed V (step S270). The concrete procedure of setting the driving resistance RL in this embodiment stores in advance a variation in driving resistance RL against the vehicle speed V as a driving resistance setting map in the ROM 74 and reads the driving resistance RL corresponding to the given vehicle speed V from the driving resistance setting map. One example of the driving resistance setting map is shown in FIG. 9.

Figure 10:
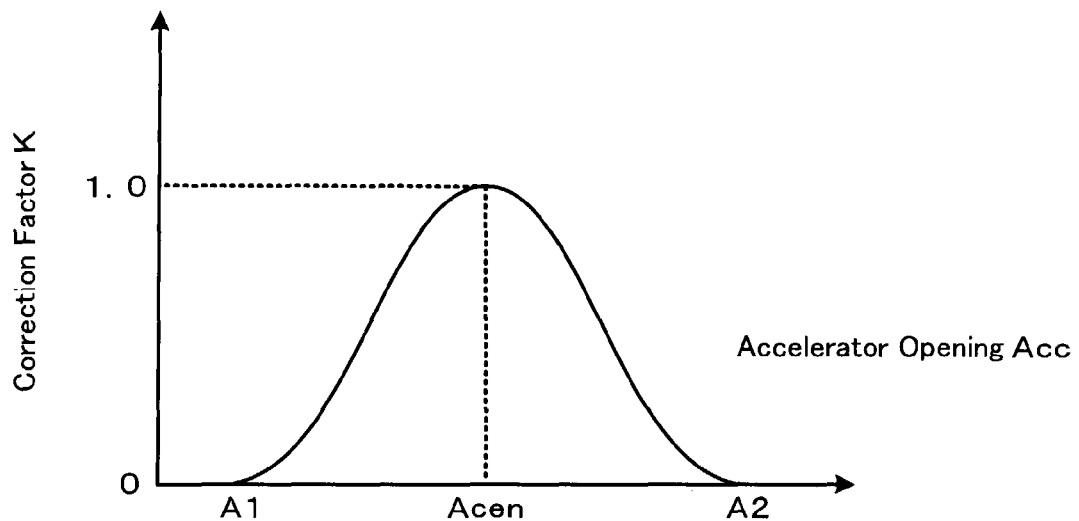
FIG. 10 shows one example of a correction factor setting map.

After setting the torque demand reduction rate TD and the driving resistance RL, the CPU 72 specifies a correction factor K as a function of the accelerator opening Acc (step S280) and computes an amount of torque demand correction ΔTr by multiplying the sum of the torque demand reduction rate TD and the driving resistance RL by the specified correction factor K (step S290). The torque demand Tr* is updated by adding the computed amount of torque demand correction ΔTr to the torque demand Tr* set at step S210 (step S300). The processing of steps S120 to S180 in the drive control routine of FIG. 2 is executed to output a torque equivalent to the updated torque demand Tr* to the ring gear shaft 32a or the drive shaft. The drive control routine of FIG. 7 is then terminated. The concrete procedure of specifying the correction factor K stores in advance a variation in correction factor K against the accelerator opening Acc as a correction factor setting map in the ROM 74 and reads the correction factor K corresponding to the given accelerator opening Acc from the correction factor setting map. One example of the correction factor setting map is shown in FIG. 10. The correction factor K increases from 0 to 1.0 against the accelerator opening Acc closer to the center opening Acen in the acceleration feel improvement area defined by the combination of the vehicle speed V between the preset speeds V1 and V2 and the accelerator opening Acc between the preset openings A1 and A2. The correction factor setting table adopted in this embodiment sets the correction factor K to 1.0 against the accelerator opening Acc equal to the center opening Acen. In this state, the sum of the torque demand reduction rate TD and the driving resistance RL is directly added to the torque demand Tr* set at step S210. The hybrid vehicle 20B is thus accelerated at a substantially constant acceleration in response to the driver's depression of the accelerator pedal 83 with the accelerator opening Acc substantially equal to the center opening Acen in the acceleration feel improvement area. It is not essential to set the correction factor K to 1.0 against the center opening Acen. The correction factor K at the center opening Acen may be set arbitrarily in the range of 0 to 1.0. The correction factor K is naturally set to prevent the torque demand Tr* updated at step S290 from exceeding its maximum allowable value.

As described above, the hybrid vehicle 20B of the second embodiment updates the torque demand Tr* by addition of the amount of torque demand correction ΔTr during acceleration in the acceleration feel improvement area. The amount of torque demand correction ΔTr is computed by multiplying the sum of the torque demand reduction rate TD, which represents the reduction rate of the torque demand Tr* for the time period between the start of acceleration of the vehicle and the present moment, and the driving resistance RL, which varies with a variation in vehicle speed V, by the correction factor K, which is set to increase against the accelerator opening Acc closer to the center opening Acen. The engine 22 and the motors MG1 and MG2 are controlled to output a torque equivalent to the updated torque demand Tr* to the ring gear shaft 32a or the drive shaft. The hybrid vehicle 20B of the second embodiment thus achieves the similar effects to those of the hybrid vehicle 20 of the first embodiment described above.

The hybrid vehicle 20B of the second embodiment updates the torque demand Tr*, based on both the torque demand reduction rate TD and the driving resistance RL. One possible modification may update the torque demand Tr*, based on only either of the torque demand reduction rate TD and the driving resistance RL.

The hybrid vehicle 20B of the second embodiment sets the driving resistance RL corresponding to the input vehicle speed V. One possible modification may set the driving resistance RL, based on a road surface slope measured by a slope sensor, in addition to the vehicle speed V. In this modified drive control, the driving resistance RL is set to increase with an increase in rising gradient of the measured road surface slope.

Figure 11:
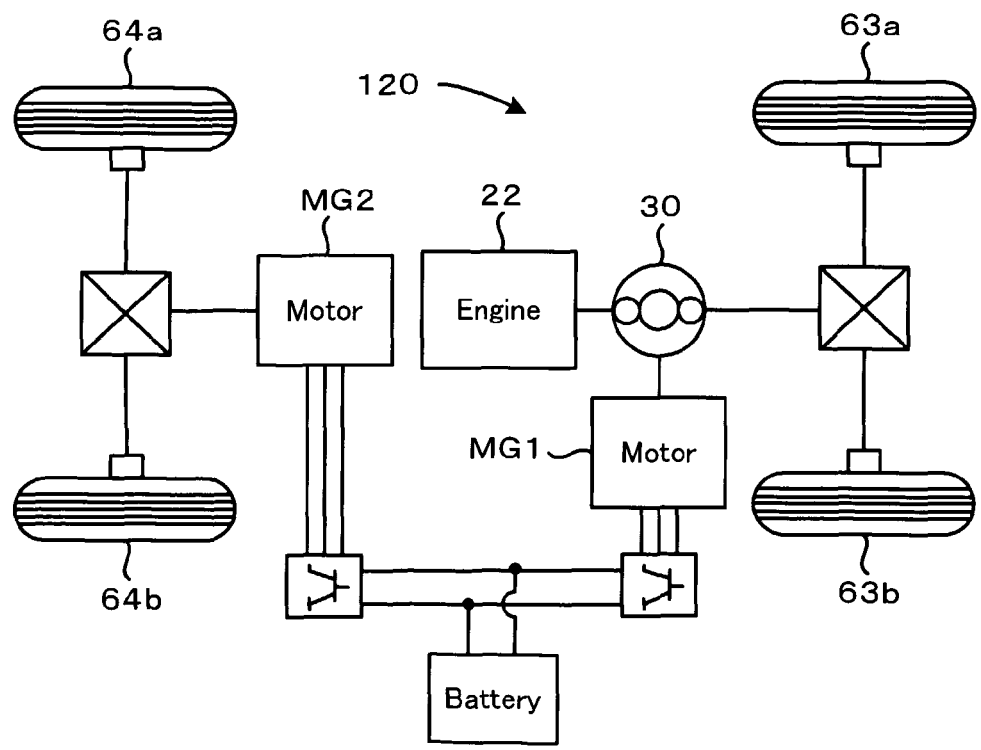
FIG. 11 schematically illustrates the configuration of another hybrid vehicle in one modified example.

In the hybrid vehicle 20 of the first and the hybrid vehicle 20B of the second embodiment, the power of the motor MG2 is subjected to gear change by the reduction gear 35 and is output to the ring gear shaft 32a. In one possible modification shown as a hybrid vehicle 120 of FIG. 11, the power of the motor MG2 may be output to another axle (that is, an axle linked with wheels 64a and 64b), which is different from an axle connected with the ring gear shaft 32a (that is, an axle linked with the wheels 63a and 63b).

Figure 12:
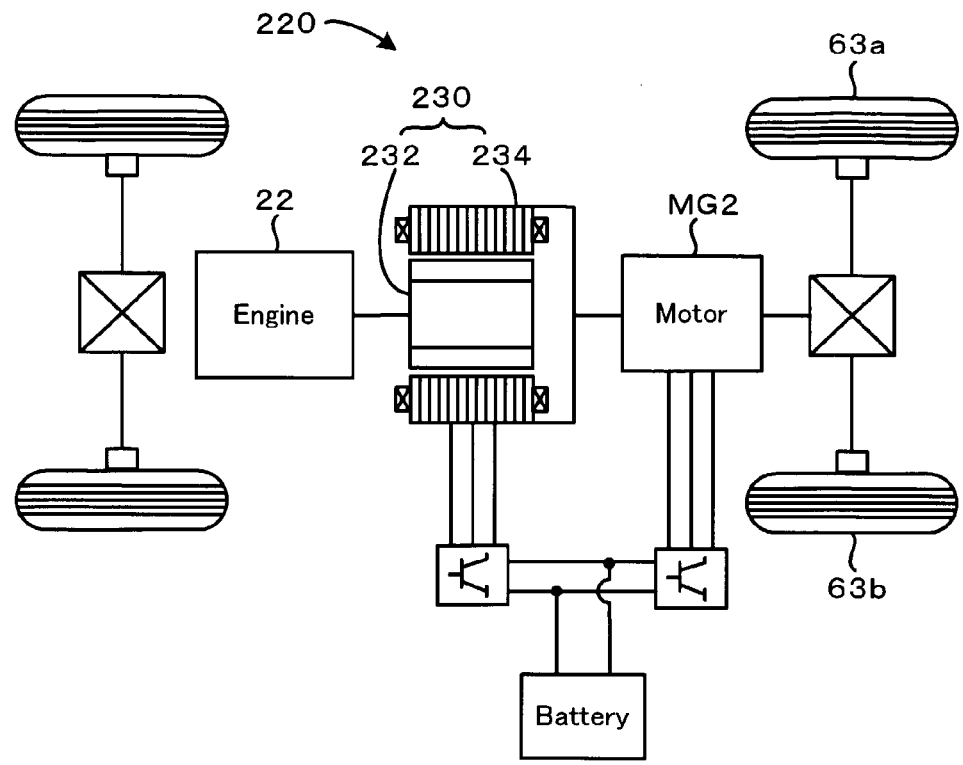
FIG. 12 schematically illustrates the configuration of still another hybrid vehicle in another modified example.

In the hybrid vehicle 20 of the first embodiment and the hybrid vehicle of the second embodiment, the power of the engine 22 is output via the power distribution integration mechanism 30 to the ring gear shaft 32a functioning as the drive shaft linked with the drive wheels 63a and 63b. In another possible modification of FIG. 12, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

Figure 13:
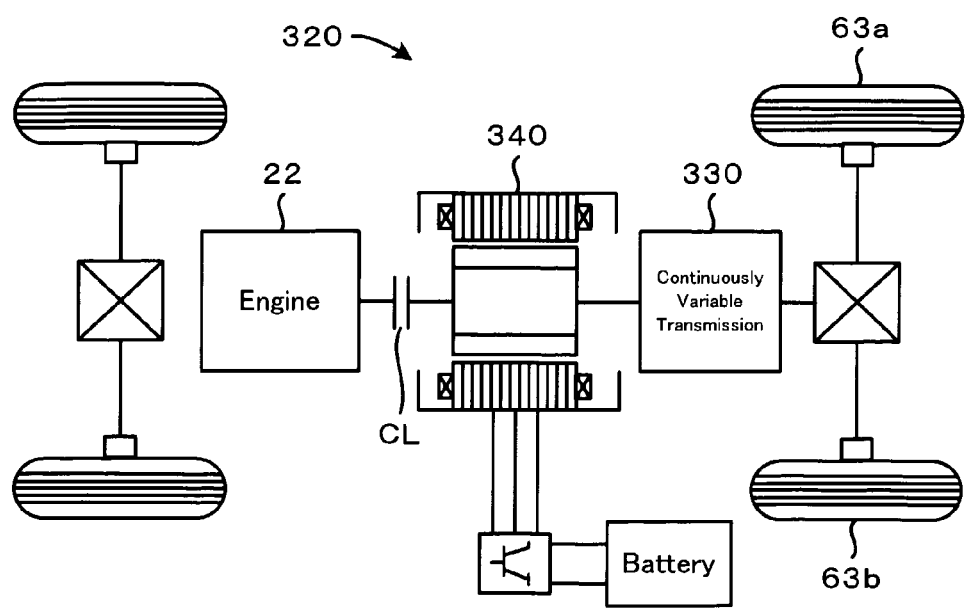
FIG. 13 schematically illustrates the configuration of another hybrid vehicle in still another modified example.

The technique of the invention is also applicable to another hybrid vehicle 320 of another modified example shown in FIG. 13. The hybrid vehicle 320 has a motor 340 that is linked to the engine 22 via a clutch CL and outputs power via a continuously variable transmission 330 to an axle connecting with drive wheels 63a and 63b.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to automobile industries.

The invention claimed is:

1. A vehicle driven with output power of a power output apparatus, said vehicle comprising:
   an accelerator depression amount measurement unit that measures a driver's depression amount of an accelerator pedal or an accelerator depression amount;
   a vehicle speed measurement unit that measures a speed of said vehicle or a vehicle speed;
   a first driving torque demand setting module that sets a driving torque demand required for said vehicle to decrease at a first reduction rate with an increase in measured vehicle speed against the measured accelerator depression amount;
   a second driving torque demand setting module that is activated, instead of said first driving torque demand setting module, at least when the measured accelerator depression amount is in a preset accelerator depression range of less than a maximum accelerator depression amount, said second driving torque demand setting module setting the driving torque demand to decrease at a second reduction rate, which is at least lower than the first reduction rate, with an increase in measured vehicle speed to an extent of or below a maximum allowable torque output from said power output apparatus; and
   a drive control module that drives and controls said power output apparatus to drive said vehicle with a torque equivalent to the set driving torque demand.

2. A vehicle in accordance with claim 1, wherein said second driving torque demand setting module sets the driving demand to ensure a greater output power of said power output apparatus with an increase in measured vehicle speed against the measured accelerator depression amount, compared with said first driving torque setting module.

3. A vehicle in accordance with claim 1, wherein said second driving torque demand setting module sets the lower driving torque demand at the second reduction rate, which decreases against the measured accelerator depression amount closer to a specific depression level in the preset accelerator depression range.

4. A vehicle in accordance with claim 1, wherein said second driving torque demand setting module sets the driving torque demand to increase with an increase in measured vehicle speed, at least when the measured accelerator depression amount is substantially equal to a specific depression level in the preset accelerator depression range.

5. A vehicle in accordance with claim 1, wherein said second driving torque demand setting module sets the driving torque demand to accelerate said vehicle at a substantially constant acceleration against the measured accelerator depression amount regardless of the measured vehicle speed in a preset vehicle speed range, at least when the measured accelerator depression amount is substantially equal to a specific depression level in the preset accelerator depression range.

6. A vehicle in accordance with claim 1, wherein said second driving torque demand setting module corrects the driving torque demand set by said first driving demand setting module to an increased value and sets the increased value to the driving torque demand.

7. A vehicle in accordance with claim 6, wherein said second driving torque demand setting module corrects the driving torque demand set by said first driving torque demand setting module to the increased value, based on a reduction of the driving torque demand set by said first driving torque demand setting module under acceleration of said vehicle for a time period between a start of acceleration and a present moment.

8. A vehicle in accordance with claim 7, wherein said second driving torque demand setting module corrects the driving torque demand set by said first driving torque demand setting module to the increased value, which becomes greater with an increase in reduction of the driving torque demand set by said first driving torque demand setting module.

9. A vehicle in accordance with claim 6, said vehicle further comprising:
   a driving resistance measurement unit that measures a driving resistance,
   wherein said second driving torque demand setting module corrects the driving torque demand set by said first driving torque demand setting module, to the increased value, based on the measured driving resistance.

10. A vehicle in accordance with claim 9, wherein said second driving torque demand setting module corrects the driving torque demand set by said first driving torque demand setting module to the increased value, which becomes greater with an increase in measured driving resistance.

11. A vehicle in accordance with claim 6, wherein said second driving torque demand setting module corrects the driving torque demand set by said first driving torque demand setting module to the increased value, based on the measured accelerator depression amount.

12. A vehicle in accordance with claim 11, wherein said second driving torque demand setting module corrects the driving torque demand set by said first driving torque demand setting module to the increased value, which becomes greater against the measured accelerator depression amount closer to a specific depression level in the preset accelerator depression range.

13. A vehicle in accordance with claim 1, wherein said power output apparatus comprises:
   an internal combustion engine; and
   a continuously variable transmission mechanism that converts power of the internal combustion engine by continuously variable torque conversion and outputs the converted power.

14. A vehicle in accordance with claim 1, wherein said power output apparatus comprises:
   an internal combustion engine;
   an electric power-mechanical power input output mechanism that is connected to an output shaft of the internal combustion engine and to a drive shaft linked with drive wheels of said vehicle and outputs at least part of output power of the internal combustion engine to the drive shaft; and
   a motor that is capable of inputting and outputting power from and to the drive shaft.

15. A vehicle in accordance with claim 14, wherein the electric power-mechanical power input output mechanism comprises:
   a three shaft-type power input output module that is linked to three shafts, the output shaft of the internal combustion engine, the drive shaft, and a third rotating shaft, and automatically determines power input from and output to a residual one shaft based on powers input from and output to any two shafts among the three shafts; and
   a generator that is capable of inputting and outputting power from and to the third rotating shaft.

16. A vehicle in accordance with claim 14, wherein the electric power-mechanical power input output mechanism comprises a pair-rotor motor that has a first rotor connected to the output shaft of the internal combustion engine and a second rotor connected to the drive shaft, and outputs at least part of the output power of the internal combustion engine to the drive shaft with input and output of electric power and mechanical power by electromagnetic function of the first rotor relative to the second rotor.

17. A control method of a vehicle that is driven with output power of a power output apparatus, said control method comprising the steps of:
(a) setting a driving torque demand required for said vehicle to decrease at a first reduction rate with an increase in measured vehicle speed against a driver's depression amount of an accelerator pedal or accelerator depression amount;
(b) at least when the accelerator depression amount is in a preset accelerator depression range of less than a maximum accelerator depression amount, instead of said step (a), setting the driving torque demand to decrease at a second reduction rate, which is at least lower than the first reduction rate, with an increase in measured vehicle speed to an extent of or below a maximum allowable torque output from said power output apparatus; and
(c) driving and controlling said power output apparatus to drive said vehicle with a torque equivalent to the set driving torque demand.

18. A vehicle driven with output power of a power output apparatus, the vehicle comprising:
An accelerator depression amount measurement unit that measures a driver's depression amount of an accelerator pedal or an accelerator depression amount;
a vehicle speed measurement unit that measures a speed of the vehicle or a vehicle speed;
a driving torque demand setting module that sets a driving torque demand required for the vehicle to have a decreasing tendency with an increase in measured vehicle speed against the measured accelerator depression amount;
a driving torque demand correction module that, at least when the measured accelerator depression amount is in a preset accelerator depression range of less than a maximum accelerator depression amount, corrects the set driving torque demand by addition of a supplementary torque corresponding to the measured accelerator depression amount in a specific range that does not exceed a maximum possible driving torque output from the power output apparatus; and
a drive control module that drives and controls the power output apparatus to drive the vehicle with a torque equivalent to the set or corrected driving torque demand.

19. The vehicle in accordance with claim 18, wherein additionally, when the measured vehicle speed is in a range between a preset first vehicle speed and a preset second vehicle speed, the driving torque demand correction module corrects the set driving torque demand by addition of the supplementary torque corresponding to the measured accelerator depression amount.

20. A control method of a vehicle that is driven with output power of a power output apparatus, the control method comprising:
(a) setting a driving torque demand required for the vehicle to have a decreasing tendency with an increase in vehicle speed against a driver's depression amount of an accelerator pedal or accelerator depression amount;
(b) at least when the accelerator depression amount is in a preset accelerator depression range of less than a maximum accelerator depression amount, correcting the set driving torque demand by addition of a supplementary torque corresponding to the accelerator depression amount in a specific range that does not exceed a maximum possible torque output from the power output apparatus; and
(c) driving and controlling the power output apparatus to drive the vehicle with a torque equivalent to the set or corrected driving torque demand.

* * * * *